United States Patent [19]
Frikken et al.

[11] 4,202,856
[45] May 13, 1980

[54] GRAPHITE-EPOXY MOLDING METHOD

[75] Inventors: Bert R. Frikken, Depew; Ronald G. Halcomb, Tulsa, both of Okla.

[73] Assignee: Rockwell International Corporation, El Segundo, Calif.

[21] Appl. No.: 838,191

[22] Filed: Sep. 30, 1977

[51] Int. Cl.$^2$ .................. B29G 5/00; B29C 17/06
[52] U.S. Cl. .................. 264/221; 264/258; 264/314; 264/317; 264/336
[58] Field of Search .......... 264/317, 314, 257, 258, 264/337, 221, 334, 336; 249/61, 62; 106/38.2

[56] References Cited

U.S. PATENT DOCUMENTS

| | | | |
|---|---|---|---|
| 1,504,547 | 8/1924 | Egerton | 264/317 |
| 2,838,435 | 6/1958 | Hewett | 264/314 |
| 3,050,780 | 8/1962 | Pollitt | 264/314 |
| 3,155,477 | 11/1964 | Swartz | 264/317 |
| 3,301,742 | 1/1967 | Noland et al. | 264/29.1 |
| 3,815,863 | 6/1974 | Andeweg | 264/314 |
| 3,895,084 | 7/1975 | Bauer | 264/29 |

FOREIGN PATENT DOCUMENTS

| | | | |
|---|---|---|---|
| 489331 | 7/1938 | United Kingdom | 264/317 |
| 574211 | 12/1945 | United Kingdom | 264/317 |

Primary Examiner—W. E. Hoag
Attorney, Agent, or Firm—Charles T. Silberberg

[57] ABSTRACT

A novel method is disclosed for the manufacture of a hollow graphite-epoxy structural part with high composite density and using tooling that eliminates the necessity of autoclave and similar high external pressure curing equipment. The method of manufacture in part involves the use of a rigid hollow frangible mandrel and superimposed flexible pressure bag element which subsequently develops high internal pressures in the part being processed during composite curing stages.

3 Claims, 5 Drawing Figures

U.S. Patent
May 13, 1980
4,202,856
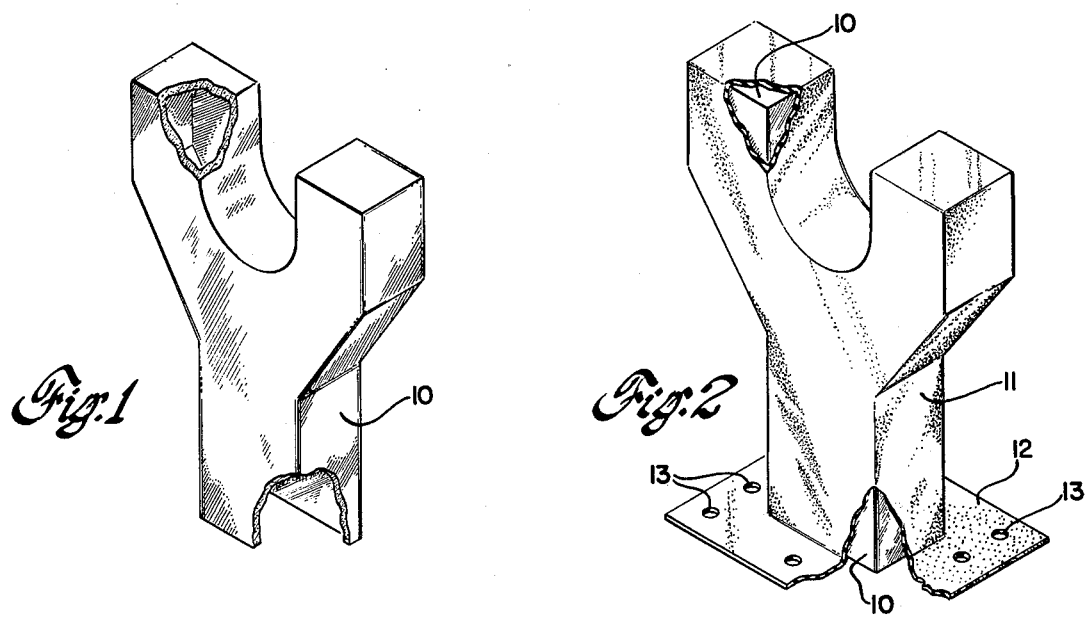
*Fig.1*
*Fig.2*
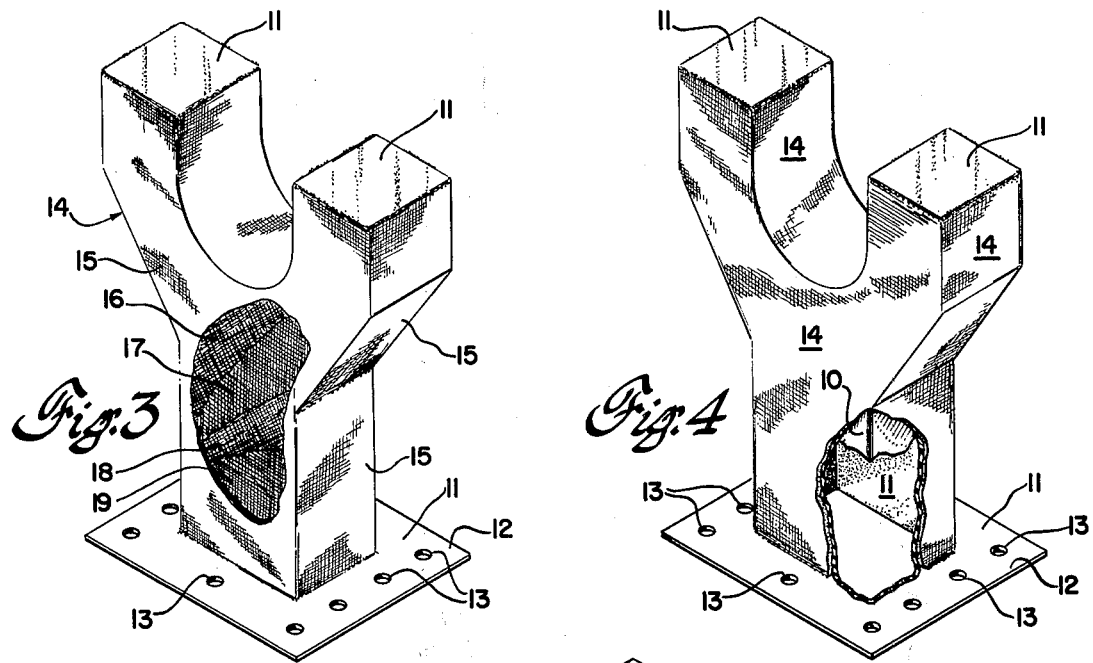
*Fig.3*
*Fig.4*
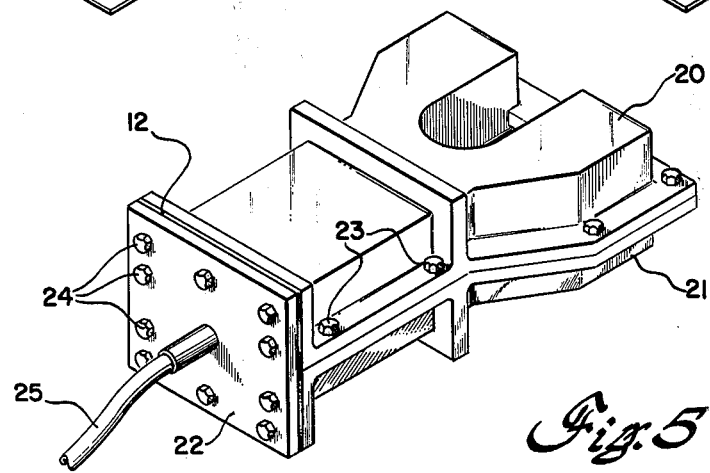
*Fig.5*

GRAPHITE-EPOXY MOLDING METHOD

SUMMARY OF THE INVENTION

A hollow mandrel having an external configuration similar to but smaller than the configuration of the graphite-epoxy part to be produced is manufactured first as by a slush casting technique using a thermocast composition and a split mold cavity with open end. Following solidification of the hollow casting the rigid mandrel form is inserted into a similarly configured but interiorly larger split mold and a superimposed flexible bag is formed on the mandrel exterior surface, such flexible bag having an exterior configuration corresponding to the internal configuration of the composite layup of the part to be manufactured. The pre-impregnated graphite-epoxy plies required for the construction of the composite part are placed upon the mandrel/bag combination as required by the part design and afterwards a portion of the frangible hollow mandrel is removed from the interior of the layup assembly and flexible bag combination. The part layup and mandrel/bag are next placed in a split mold having an interior cavity configuration corresponding to the exterior configuration of the part to be produced and the mold assembled. The total assembly is placed in oven equipment at ambient pressures and a high pressure fluid is ported to the interior of the hollow mandrel to pressurize the inflatable bag against the composite layup and mold interior during curing at elevated temperatures. Following completion of the curing cycle the mold is opened and the part and its contained mandrel/pressure bag are removed for the final process step which involves wash-out of the mandrel material and removal of the flexible inflatable bag from the part interior.

DESCRIPTION OF THE DRAWINGS

FIG. 1 is a partially broken perspective view of a preferred type of hollow cast mandrel used in the practice of this invention;

FIG. 2 is a partially broken perspective view of the FIG. 1 mandrel with a superimposed pressure bag element;

FIG. 3 is a partially broken perspective view of the mandrel/bag assembly of FIG. 2 with a superimposed layup of epoxy-impregnated graphite plies;

FIG. 4 is a partially broken perspective view of the FIG. 3 assembly showing partial removal of the interiorly located rigid mandrel; and FIG. 5 is a perspective view of a closed split mold containing the assembly of FIG. 4 prior to placement in an oven for curing of the epoxy-graphite material.

DETAILED DESCRIPTION

FIGS. 1 through 5 of the drawings illustrate key steps in our preferred method of manufacturing a hollow graphite-epoxy composite structural part. The first step involves the manufacture of a hollow frangible rigid mandrel having an external configuration generally similar to but smaller than the configuration of the part to be produced. In FIG. 1 a suitable mandrel for subsequent use in the manufacture of a composite antenna yoke part is designated 10 and such is preferably formed by the slush casting of a thermo-cast material such as polyethylene, sodium and potassium chloride salt mixture, or the like. An open ended split mold having an interior cavity approximately $\frac{1}{4}$ to $\frac{1}{2}$ inch uniformly smaller than the interior configuration of the part to be produced is used in the mandrel casting operation. Mandrel 10 normally has a wall thickness of approximately $\frac{1}{4}$ inch and is rigid and frangible at ambient temperatures. Preferably the mold for making mandrel 10 is preheated to an elevated temperature such as 200° F. and the mold is filled with molten mandrel material. After cooling and solidification to the extent of the $\frac{1}{4}$ inch wall thickness, the mold is emptied of the unsolidified or molten mandrel material and the slush-cast rigid hollow mandrel is then removed for use in the manufacture of a superimposed flexible pressure bag.

An additional open-ended split mold (not shown) having a molding cavity configuration generally similar to but larger than the exterior configuration of mandrel 10 is utilized in the molding of the superimposed pressure bag 11 illustrated in FIG. 2 with attached integral flange 12. The mandrel 10 completed in connection with the first principal step of the invention is placed in the larger mold, the mold closed, and silicone rubber is injected into the mold intermediate the mold cavity wall and mandrel 10 to form the bag. Bag 11 normally is formed with a wall thickness of $\frac{1}{8}$ inch to $\frac{1}{4}$ inch. Holes 13 are afterwards provided in flange 12 of the cured pressure bag to facilitate assembly of the tooling required for final curing of the desired composite part.

FIG. 3 illustrates a layup assembly 14 which is superimposed upon the pressure bag 11 and mandrel 10 combination and which essentially comprises the composite part that is to be molded. Layup 14 consists of plies 15 through 19 of epoxy-impregnated graphite reinforcement frequently in woven form. The number, orientation and manner of placement of plies of graphite-epoxy material on the mandrel/bag combination is determined by strength and other requirements of the composite part based on conventional design considerations.

Next, it is important that a portion of hollow mandrel 10 be removed from the interior of bag 11 following completion of layup 14. This allows compressed air to act on the interior of bag 11 for expansion thereof as discussed hereinafter. FIG. 4 illustrates the total assembly ready for curing and with a portion of mandrel 10 removed.

Lastly, the layup assembly 14 superimposed upon flexible bag 11 and partial mandrel 10 are placed in a split die comprised of mold halves 20 and 21 and mold base 22. See FIG. 5. The configuration of the mold cavity within mold halves 20 and 21 corresponds to the external configuration of the part to be produced and has the same size. Fasteners 23 are utilized to join mold halves 20 and 21 together and fasteners 24 are utilized to secure base 22 to mold halves 20 and 21. The finally assembled FIG. 5 mold must be pressure tight. Compressed air at elevated pressure is ported through airline 25 into the interior of flexible pressure bag 11 and mandrel 10 during the curing cycle for layup 14.

In one specific example of the practice of this invention a hollow mandrel 10 was formed of thermocast material heated to 385°–400° F. by slush casting in a mold having a temperature of approximately 200° F. Slush casting continued until the thermocast material had built up to a mandrel wall thickness of approximately $\frac{1}{4}$ inch. Next, a silicone rubber pressure bag 11 was molded on the surface of mandrel 10 to a uniform thickness of approximately $\frac{1}{8}$ inch and cured. Following bag curing and removal from the mold, a total of 43 plies of graphite-epoxy prepreg material, some in fabric form and some in tape form, were applied to the combined mandrel/pressure bag using conventional layup techniques. Prepreg plies were oriented with their directions of principal reinforcement at 45° and 90° angles with respect to each other. The layup plies were vacuum debulked at intermittent stages in the layup procedure. Following completion of the layup, a substantial portion of the hollow mandrel was fractured and removed from within the flexible bag in the vicinity of the assembly end region closest to flange 12.

Finally, the completed layup, pressure bag, and partial mandrel were assembled into a cast aluminum split mold having a cavity configuration corresponding to the configuration of a yoke antenna structural part and the mold closed with an end plate in a manner to withstand an internal pressure of 350 pounds per square inch. The assembled mold was placed in an oven and a compressed air line was attached to the mold base plate and arranged to provide compressed air to the interior of flexible pressure bag 11. The curing cycle involved an oven temperature rise from ambient temperature to 250° F. at rates of 2° F. to 4° F. per minute, a 15 minute dwell at 250° F., and then an increase in temperature from 250° F. to 350° F. continuing at a rate of 2° F. to 4° F. per minute. Final curing was accomplished maintaining the oven and layup at 350° F. for two hours. Afterwards the cured part was cooled to 150° F. before disassembly of the tool and part removal. The processing utilized a pressure bag pressure of 25 psi from cycle start to a stabilized oven temperature of 250° F. The internal pressure of the pressure bag was then increased to 85 psi for the final curing and post cooling stages. After disassembly of the mold and part removal, the residue of the mandrel was removed from within the pressure bag by water washing and the flexible pressure bag removed from within the cured part. Trimming to drawing specifications and final inspection completed the operation.

We claim:

1. A method of forming a fiber reinforced thermosetting resin composite structural part having a hollow configuration comprising the following steps in the sequence set forth:
   (a) providing a hollow, rigid, frangible mandrel having an exterior configuration substantially similar to but sized smaller than the configuration and size of said structural part;
   (b) forming a flexible pressure bag on said rigid hollow mandrel, said pressure bag having an interior configuration corresponding to said mandrel exterior configuration and having an exterior configuration substantially similar and sized the same as the interior configuration of said composite structural part;
   (c) assembling plies of fiber reinforced thermosetting resin material on said pressure bag;
   (d) fracturing and removing at least a portion of said hollow, rigid, frangible mandrel from within said pressure bag;
   (e) enclosing any remaining portion of said hollow mandrel, said pressure bag, and said assembled plies of fiber reinforced resin material in a split mold having a molding surface with a configuration corresponding to the exterior configuration of said structural part; and
   (f) curing said fiber reinforced thermosetting resin material plies in said split mold at an elevated resin curing temperature and with an internal pressure within said pressure bag significantly greater than ambient pressure.

2. The method of claim 1 wherein said flexible pressure bag has an integral flange extending outwardly from said mandrel.

3. The method of claim 2 also including the step of connecting said split mold to said flange after said enclosing step.

* * * * *